Jan. 1, 1963   W. F. MICK   3,071,162
STEEL PIPE HAVING ORGANIC THERMOPLASTIC
LINER WITH GLASS FIBER REINFORCEMENT
Filed Oct. 6, 1959

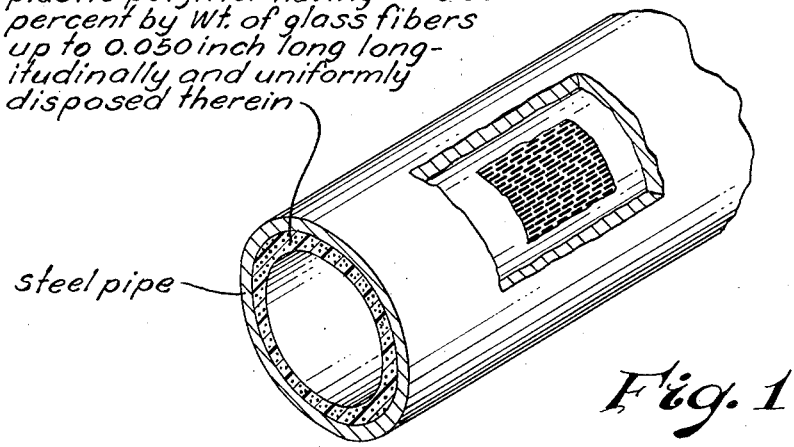

Pipe liner of an extruded thermoplastic polymer having 10 to 25 percent by Wt. of glass fibers up to 0.050 inch long longitudinally and uniformly disposed therein steel pipe

Fig. 1

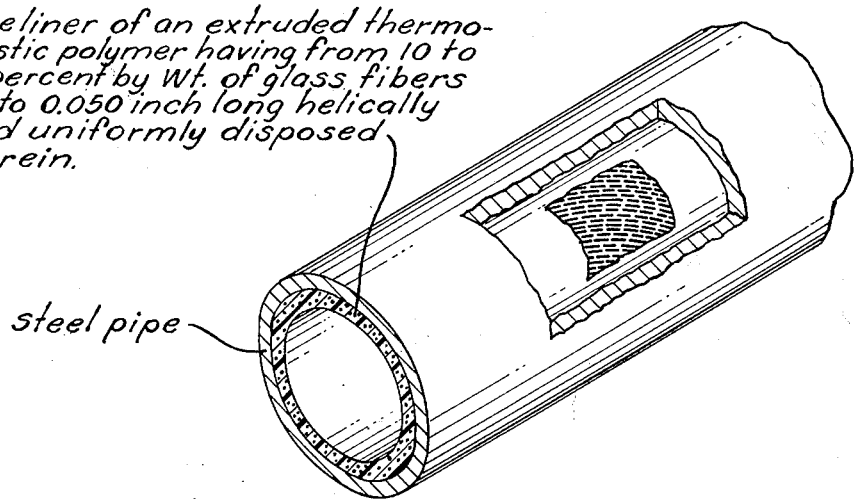

Pipe liner of an extruded thermoplastic polymer having from 10 to 25 percent by Wt. of glass fibers up to 0.050 inch long helically and uniformly disposed therein.

steel pipe

Fig. 2

INVENTOR.
William F. Mick
BY
Griswold & Burdick
ATTORNEYS

United States Patent Office 3,071,162
Patented Jan. 1, 1963

3,071,162
STEEL PIPE HAVING ORGANIC THERMOPLASTIC LINER WITH GLASS FIBER REINFORCEMENT
William F. Mick, Midland, Mich., assignor to The Dow Chemical Company, Midland, Mich., a corporation of Delaware
Filed Oct. 6, 1959, Ser. No. 844,803
3 Claims. (Cl. 138—140)

This invention relates to plastic lined steel pipe, whereof the organic thermoplastic liner is of a composition having a coefficient of expansion much nearer that of steel than has the thermoplastic component thereof, alone.

Plastic pipe and plastic-lined steel pipe have been in use for several years, especially for transporting fluids which attack or are discolored by the more familiar metal pipes. Among the plastics which have been so-employed are the copolymers of 70 to 95 percent vinylidene chloride, balance vinyl chloride. Other organic thermoplastics useful in making linings for steel pipes, adapted to special uses in the oil, chemical and other liquid handling industries, include polyvinylchloride, polystyrene, polypropylene and polyethylene (both branched or low density and linear or high density varieties). One disadvantage of plastic pipe and more particularly of plastic lined steel pipe when made using such polymers or copolymers, or using others of the relatively rigid and inelastic plastics, is the appearance of stress failure when the pipe is subjected to cyclic temperature fluctuations. Under such conditions, plastic lined pipe often fails due to a break in the lining which is attributed to the differential expansion between the plastic liner and the steel casing.

A conventional procedure for making plastic pipe involves extrusion of the plastic about a mandrel which is advanced with or without rotation, carrying a plastic sheath out of the extruder. Commonly, this sheath is smoothed out and made of uniform thickness by means of rollers which are cocked at an axial angle to the path of advance of the rotating mandrel. Rotation of the mandrel results in a somewhat helical orientation of the plastic about the mandrel. When cooled, the pipe is slipped from the mandrel. If it is to be used to line steel pipe, the plastic pipe is usually inserted in a tubular steel shell of slightly larger diameter, and the steel shell is swaged down into tight and usually compressive conformity with the plastic liner, so that the liner cannot slip. The problem noted in use of such lined pipe appears to arise because the common steel tubes employed have coefficients of linear expansion of the general order of 0.9 to $1.5 \times 10^{-5}$ inch/inch/° C., while the plastic liner may have a corresponding value from 10 to $30 \times 10^{-5}$ inch/inch/° C. Since the assembly is quite hot at the time the steel case is swaged into restraining contact with the plastic, the latter continually attempts to shrink when at any lower temperature in its normal service range. If such shrinkage exceeds the elastic limit of the relatively inelastic liners, the described stress failure becomes inevitable.

It is the principal object of this invention to provide a substantially rigid and inelastic thermoplastic liner for steel pipe, whereof the coefficient of linear expansion is so substantially reduced as to bring the dimensional changes encountered with normal service temperature variations within the elastic limit of the liner. Other and related objects will be apparent from the description of the invention.

The composition useful in the present invention consists essentially of the organic thermoplastic from which the plastic pipe is to be made and from 10 to 25 percent, preferably from 10 to 22 percent, based on the weight of the composition, of short pieces of glass fibers substantially uniformly distributed therethrough.

A convenient method of preparing the composition of glass fibers and thermoplastic material is to mix the desired proportion of glass fibers with the thermoplastic while advancing the latter through the hot barrel of an extruder, such as one having parallel dual feed screws, and extruding the mixture therefrom as a strip or tape. The thermoplastic may advantageously be supplied to the extruder as small flakes, suitably as cut pieces of plastic film which may be from 0.25 to 0.5 inch on a side and from 0.0005 to 0.004 inch thick. The glass fibers supplied with the feed are preferably from 0.06 to 0.5 inch long, and of any diameter up to about 0.001 inch. The extrudate is a dense strip, having glass fibers dispersed uniformly therein, and may be cut or coarsely ground to provide granular or coarse powder particles of the composition suitable as feed to the pipe-forming extrusion operation. In the described process of making the fiber-filled composition, as well as in the pipe-forming operation to follow, the glass fibers are further broken into pieces having lengths ranging from about 0.003 to about 0.050 inch long, the average length found in the finished plastic pipe being about 0.010 to 0.015 inch.

The pipe-forming procedure whereby the benefits of the invention are realized comprises extruding the above-described glass fiber and plastic mixture through a pipe-forming die about an axial mandrel while advancing the mandrel through the die as previously described, preferably without rotation. The so-formed pipe is cooled to a temperature well below its softening point and is slipped off the mandrel. It may be used in conventional manner either as a plastic pipe or as plastic liner for a steel pipe. In either case, it has much greater strength and dimensional stability than a similar pipe without the glass fibers. When produced over a non-rotating mandrel, the pipe has greater strength and dimensional stability than a pipe of the same composition made over a rotating mandrel. It is observed that the coefficient of linear expansion of the plastic pipe is reduced by the presence of the glass fibers and that there is twice as great an effect in reducing the coefficient when the extrusion is linear, using a non-rotating mandrel, as when it is helical, using a rotating mandrel.

It could be predicted arithmetically that there should be a reduction of $0.16 \times 10^{-5}$ inch/inch/° C. in the coefficient of expansion for each percent by weight of glass fibers blended with a vinylidene chloride copolymer. The observed facts are surprising, in that helically formed vinylidene chloride copolymer pipe containing glass fibers show a reduction of $0.35 \times 10^{-5}$ in the coefficient, for each percent by weight of glass fibers, while the corresponding change in linearly extruded pipe is $0.7 \times 10^{-5}$ for each percent of glass fibers.

In a direct comparison, pipe was made from a copolymer of about 85 percent vinylidene chloride and 15 percent vinyl chloride, and other pipe was made from the same copolymer film scrap which had been blended with 20 percent by weight of glass fibers, as described. Some pipe was made by linear extrusion, and some by using a rotating mandrel. The coefficient of linear expansion was measured on each specimen, at 25° to −40° C.

| Specimen: | Coefficient of expansion, in./in./° C. |
|---|---|
| (1) Plastic—no glass—helical | $16 \times 10^{-5}$ |
| (2) Plastic—no glass—linear | $16 \times 10^{-5}$ |
| (3) Plastic—20% glass—helical | $9 \times 10^{-5}$ |
| (4) Plastic—20% glass—linear | $2.4 \times 10^{-5}$ |

Specimens 1 and 2 had typical tensile strengths near 2900 pounds per square inch, while that of specimen 3 was near 3000 pounds, and that of specimen 4 was 3140 pounds per square inch. The presence of the glass fibers increased the impact strength of the product at −18° C. from values near 1.1 foot pounds for specimen 1 to values from 3 to 5 for specimens 3 and 4, respectively.

Plastic lined steel pipe, of nominal 2 inch diameter was made from specimens 1, 3, and 4. These were subjected to repeated temperature fluctuations until failure occurred. The temperatures used were sometimes outside of the normal temperatures recommended for such pipe, to provide an accelerated test. The pipe containing no glass fibers failed after one cycle from 25° C. to −40° C. and return. The pipe containing the helically disposed glass fibers withstood in succession two cycles from 25° C. to −40° C., one cycle from 25° C. to −48° C., and one cycle from 70° C. to −48° C. with a failure on the last cycle of only one of several lengths being tested. The pipe with the longitudinally disposed glass fibers withstood the same treatment, plus several of the cycles from 70° C. to −48° C. without failure. The coefficient of linear expansion had been reduced to such a low value that the plastic composition was not strained beyond its elastic limit by the thermally induced changes in dimensions of the steel casing.

Other tests show that there is little benefit to be derived from the use of less than 10 percent glass fibers in the compositions, and that amounts greater than 25 percent glass render the compositions very difficult to extrude. The most useful range of proportions, considering both the ease of extrusion and the amount of reduction to be obtained in the coefficient of expansion, is from 10 to 22 percent glass fibers.

The invention has been illustrated with respect to the commonly employed vinylidene chloride-vinyl chloride copolymer thermoplastic pipe. It is applicable as well to other rigid or semi-rigid thermoplastic pipe of low elasticity. Examples of such pipe in common use are the vinyl chloride polymer pipe and, even more extensively used, polyethylene pipe. Although polyethylene sometimes has a coefficient of linear expansion greater than that of the herein described vinylidene chloride copolymers, it also has a somewhat greater elasticity, and it has been found that an amount from about 10 to 22 percent of glass fibers, longitudinally disposed, accomplishes the desired improvement in polyethylene-lined steel pipe.

To illustrate the benefit of the invention to thermoplastics other than the particular copolymer of the foregoing illustrative example, plastic liners for steel pipe were made with the thermoplastics identified in the following table, to each of which was added enough of the glass fibers to make an 80–20 composition, as before. Some of each batch was made into pipe using a non-rotating mandrel, and some was made into pipe using a rotating mandrel. Other pipes were made from the thermoplastic without any fibrous filler, for comparison. These last are designated in the table as "blanks." The table compares the coefficients of expansion of the several products. The units employed are inches ×10⁻⁵/inch of length/° C.

| Thermoplastic Substance | | Coefficient of Expansion of Pipe | | | |
|---|---|---|---|---|---|
| | | Linear Extrusion | | Helical Extrusion | |
| | | Coefficient | Change | Coefficient | Change |
| Copolymer 90 vinylidene chloride, 10 vinyl chloride | Blank | 12 | | 9 | |
| | With Glass | 1.5 | 10.5 | 5 | 4 |
| Polyvinylchloride | Blank | 11 | | 10 | |
| | With Glass | 1.5 | 9.5 | 8.8 | 1.2 |
| Polystyrene | Blank | 5.5 | | 6.5 | |
| | With Glass | 1.5 | 4.0 | 5.0 | 1.5 |
| Linear Polyethylene | Blank | 12.0 | | 12.0 | |
| | With Glass | 1.0 | 11.0 | 9.0 | 3.0 |

In the appended drawings:

FIG. 1 represents a portion of steel pipe in compressive conformity with a glass-fiber filled thermoplastic liner, in accordance with the invention. The disposition of the glass fibers is illustrated in a cutaway view of the same piece of lined pipe, showing longitudinal alignment of the glass fibers.

FIG. 2 is a similar view of another embodiment, wherein the glass fibers are helically disposed. As shown in the drawings, the pieces of glass fibers are disposed with their longitudinal axes parallel to one another and along lines extending from one end of the pipe to the other.

In addition to the advantages arising from the changes in coefficients of expansion, it is noted that the liners of the present invention have higher thermal conductivity values. Thus, in one specimen containing 20 percent glass fibers, the conductivity value was 50 percent higher than in the corresponding blank ($4.5 \times 10^{-4}$ vs. $3.0 \times 10^{-4}$ cal./sec./cm.²/° C./cm.).

I claim:

1. A steel pipe in compressive engagement with a semi-rigid to rigid and substantially inelastic liner made of a thermoplastic polymer composition containing from 10 to 25 percent of its weight of pieces of glass fibers whose lengths are principally in the range from 0.003 to 0.050 inch, uniformly distributed throughout the polymer composition and aligned with their longitudinal axes parallel to one another and disposed along lines extending from one end of the pipe to the other.

2. The lined pipe claimed in claim 1, wherein the glass fibers are longitudinally disposed in the wall of the said liner.

3. The lined pipe claimed in claim 1, wherein the glass fibers are helically aligned in the wall of the said liner.

References Cited in the file of this patent

UNITED STATES PATENTS

| 1,708,141 | Kepler | Apr. 9, 1928 |
| 2,135,057 | Slayter et al. | Nov. 1, 1938 |
| 2,308,307 | Robinson | Jan. 12, 1943 |
| 2,467,999 | Stephens | Apr. 19, 1949 |
| 2,664,373 | Reilly | Dec. 29, 1953 |
| 2,688,774 | Malinowski | Sept. 14, 1954 |
| 2,723,882 | Barnett | Nov. 15, 1955 |